United States Patent [19]
Hutchings

[11] Patent Number: 5,940,813
[45] Date of Patent: Aug. 17, 1999

[54] PROCESS FACILITY MANAGEMENT MATRIX AND SYSTEM AND METHOD FOR PERFORMING BATCH, PROCESSING IN AN ON-LINE ENVIRONMENT

[75] Inventor: Thomas A. Hutchings, Ballwin, Mo.

[73] Assignee: Citibank, N.A., New York, N.Y.

[21] Appl. No.: 08/686,524

[22] Filed: Jul. 26, 1996

[51] Int. Cl.[6] .............................. G06F 17/60; G06F 15/30; H04M 1/274; H06K 11/10
[52] U.S. Cl. ................................. 705/43; 705/38; 705/40; 705/21; 705/17; 705/45; 364/400; 364/408; 364/401; 360/825.33
[58] Field of Search ..................................... 364/408, 401; 235/379; 379/67, 115; 395/800, 244, 155, 240, 375; 382/115; 705/17, 21, 40, 43, 38, 45

[56] References Cited

U.S. PATENT DOCUMENTS

| | | |
|---|---|---|
| 4,673,802 | 6/1987 | Ohmae et al. ............................ 235/379 |
| 4,727,243 | 2/1988 | Savar . |
| 4,774,664 | 9/1988 | Campbell et al. ......................... 705/38 |
| 4,797,911 | 1/1989 | Szlam et al. ............................... 379/67 |
| 4,894,857 | 1/1990 | Szalam et al. ............................. 397/67 |
| 5,095,421 | 3/1992 | Freund . |
| 5,115,392 | 5/1992 | Takamoto et al. . |
| 5,182,706 | 1/1993 | Cunningham et al. .................... 705/45 |
| 5,220,665 | 6/1993 | Coyle, Jr. et al. . |
| 5,283,897 | 2/1994 | Georgiadis et al. . |
| 5,363,121 | 11/1994 | Freund . |
| 5,404,523 | 4/1995 | DellaFera et al. . |
| 5,410,698 | 4/1995 | Danneels et al. ........................ 395/650 |
| 5,438,509 | 8/1995 | Heffron . |

(List continued on next page.)

FOREIGN PATENT DOCUMENTS

| | | |
|---|---|---|
| 4305742 | 10/1992 | Japan . |
| 6139120 | 5/1994 | Japan . |
| 8044670 | 2/1996 | Japan . |
| 8161264 | 6/1996 | Japan . |

OTHER PUBLICATIONS

PCT Written Opinion dated Sep. 30, 1998.
Jean Davis "GTE Spacenet introduces a network management system for its satellite–based Skystar (R) Network Services at the National Computer Conference", Press Release, Chicago, IL, 2 pages, Jun. 15, 1987.
Laurence J. Best, "Building software skyscrapers (large software projects)", Datamation, vol. 36, n6, p. 67(4), Mar. 15, 1990.

Primary Examiner—Allen R. MacDonald
Assistant Examiner—Pedro R. Kanof
Attorney, Agent, or Firm—George T. Marcou; Kilpatrick Stockton LLP

[57] ABSTRACT

A processing system and method receive batch payment data from a plurality of different sources, such as lock-boxes, an ATM or customer activated terminal, an enhanced telephone, a bank teller, or a personal computer. The batch payment data is converted into individual transaction data for on-line processing and is sent to a temporary payment queue. A transaction mover places the data from the queue to a transaction queue and a transaction router subsequently assigns the transactions to available drivers. Each driver processes the payment data and makes appropriate account information updates to a set of master files. A transaction handler coordinates the control of the transaction mover as well as the control of the transaction router. The system operates in conjunction with on-line operations, such as customer service and other mortgage services, and has a transaction handler monitor which controls the speed of processing so that on-line operations can continue during the processing of the payment data. Since the updates to the master files to reflect the received payment data occur during normal operating hours and not at the end of the day, delays in updating account information can be significantly reduced. The speed control offered by the handler monitor enables the system and method to balance the processing of the received batch data with normal CICS activity.

35 Claims, 12 Drawing Sheets

U.S. PATENT DOCUMENTS

| | | |
|---|---|---|
| 5,440,634 | 8/1995 | Jones et al. . |
| 5,442,758 | 8/1995 | Slingwine et al. . |
| 5,475,813 | 12/1995 | Cieslak et al. . |
| 5,504,677 | 4/1996 | Pollin .................................. 364/408 |
| 5,590,366 | 12/1996 | Bryant et al. ...................... 395/800 |
| 5,649,117 | 7/1997 | Landry ................................ 395/240 |
| 5,710,889 | 1/1998 | Clark et al. ........................ 395/244 |

PROCESS FACILITY MANAGEMENT MATRIX AND SYSTEM AND METHOD FOR PERFORMING BATCH, PROCESSING IN AN ON-LINE ENVIRONMENT

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or of the patent disclosure, as it appears in the Patent and Trademark Office patent file or records, but otherwise reserves all copyright rights whatsoever.

FIELD OF THE INVENTION

The invention generally relates to a transaction processing system and method and, more particularly, to a speed-controlled system and method for processing mortgage payments and other types of batch data in conjunction with other on-line processing.

BACKGROUND OF THE INVENTION

In a typical mortgage processing system, a branch facility, otherwise known as a lock-box, receives payments from the mortgagees or customers and performs an initial amount of processing on each payment. This processing includes the scanning of a payment coupon and an enclosed check and storing the data associated with each payment in batch form in a database. At the end of the day, the lock-box facility transmits the batch payment data to a central processing facility. A mortgage processing system may have a plurality of lock-boxes with each lock-box responsible for payments within a certain geographical region and each lock-box transmitting its batch payment data to the central facility at the end of the day.

The central processing facility receives the payment data in batch form from the various lock-boxes and performs batch processing. More specifically, the central facility updates a set of master files by making appropriate changes to the principal, interest, and escrow for each account. The number of accounts updated in one day can easily approach twenty to thirty thousand, whereby the central facility expends an enormous amount of time performing the batch processing of the payment data.

In addition to the batch processing of payment data, the central processing facility performs some additional functions. For instance, the central facility also provides normal users of the system with on-line access to account information in the master files. These users need to access the master files in real-time in order to provide customer services and to provide other types of mortgage services. Because the system provides these services to the various users in real-time, the central facility must perform the batch processing of the payment data after the normal users are finished with the system at the end of the day. The central facility is unable to perform the batch processing during the day since the batch processing would tie up the master files and present unacceptable delays to the normal users of the system in their attempts to gain access to the master files.

Because the batch processing of the payment occurs at the end of the day, a delay of twenty four hours or more can occur between the time that a lock-box receives a customer's payment through the mail and the time that the central facility posts the payment to the customer's account. This delay can be especially problematic when the lock-box receives the payment on or just prior to the payment deadline since the system might erroneously assess a late payment charge to the customer. The delay is also problematic in that normal users providing customer service and other mortgage services might not have the most up-to-date account information. As a result, the normal users would be unable to reconcile the account information that they access from the master files with the customer's own personal records. The conventional payment processing system therefore suffers from a disadvantage that payments may not be posted until a relatively long delay after a customer deposits a payment with a lock-box or other similar type of receiving facility.

Another common problem facing batch processing of payment data is that the batch processing can adversely impact the normal day-time on-line functions. When the central processing facility receives a large amount of batch data, which occurs near the mortgage payment due date, the amount of time required to process the batch data significantly increases. During these heavy load times, the central facility might have to delay the normal users from obtaining on-line access to the account data until the central facility has finished the batch processing. This added processing time is highly detrimental to the system since the on-line operations, such as customer service and other mortgage services, are temporarily suspended.

These problems in batch processing are not limited to just the batch processing of mortgage payments but apply equally as well to other types of batch processing. For example, in addition to mortgage payments, payment processing systems suffer similar problems in delayed postings with car payments, credit card payments, and foreclosure related transactions. Furthermore, the problems with delayed postings are not special to payment processing systems but may be encountered in any type of batch data processing system.

A previous processing system developed by the assignee of the present invention attempted to address some of these problems. The previous system was a BSS processing system used to process mobile home transactions. The system had a mover for transferring files, a router for assigning transactions to a driver, and a driver for processing the transaction. The BSS system had a monitor that tracked the completion of large bulk units of work. For instance, the handler might initially send two hundred transactions to be processed in conjunction with other on-line processing. At each minute, the handler would ensure that the system maintained this bulk amount of work by supplying additional transactions equal in number to the number of transactions processed. Thus, if the handler detected that forty transactions of the original two hundred still need to be processed, the handler would supply an additional one hundred sixty transactions to maintain the two hundred back-log of work. The monitor used to control the speed of the system suffered from a disadvantage that the speed control was very slow to respond to environmental changes. For instance, the system would respond very slowly to any drop in processing from normal on-line users of the system and would likewise react very slowly to any increase in demand from these normal users. As a result, the processing of the transactions in the on-line environment presented a significant mount of interference with the normal users of the system.

Thus, a need exists for a system or method for processing batch data which reduces the delays in posting updated information. Furthermore, a need exists for a system or method for processing batch data which reduces the amount of adverse effects on any on-line processing.

SUMMARY OF THE INVENTION

The invention, in a preferred embodiment, is a payment processing system that includes a receiving facility for receiving payments and a central facility for processing the payments. The receiving facility generates batch payment data based on the payments to individual accounts and a batch converter in the central facility converts the batch payment data into payment transaction data for the individual accounts. In the central facility, a transaction mover places the transaction data on a transaction queue and a transaction handler assigns individual transaction routers to the transaction data. The routers, in turn, assign the transaction data to payment drivers which actually process the data by updating master files to reflect the payments. A transaction monitor tracks completion times for each transaction driver and determines a number of drivers that may be active based on the completion times. The monitor provides speed control by writing the permissible number of drivers to a temporary storage queue which the handler subsequently reads to limit the number of active routers.

With the invention, data which is received in batch form can be converted into transaction data and processed in an on-line environment. The facilities for receiving the payments, such as lock-boxes, need not wait until the end of the day to transmit the data but may instead promptly transfer this data to be processed soon after the data is collected. In view of the speed control enacted through the monitor, the processing of the converted data can occur during the day-time hours and need not be delayed until late into the night. Consequently, customers are able to obtain updated information on their accounts in a much more expedient manner. Further, since updates to the accounts are made much more quickly, customer service and other account services are not disadvantaged but may instead provide their services in a much more efficient and timely manner.

The monitor advantageously provides continuous speed control of the system. The monitor derives an average completion rate for the drivers and, based on this value, adjusts the number of permissible drivers accordingly. The number of drivers, however, is limited by a maximum number so as to limit the maximum speed of the system. With this speed control, the system is able to quickly sense environmental conditions impacting on the amount of processing power available for the payment transaction data and can quickly respond to the environmental conditions so as to minimize the effects of the payment processing on the other on-line processes.

The processing system preferably receives payments from a plurality of different sources, such as a lock-box facility, a CAT or other automated teller machine, an enhanced telephone, or a personal computer. Each of these payments can be processed at the processing system without disrupting normal on-line users of the system. These different types of payments are preferably classified into different priority groups with the CAT payments being processed first followed by the lock-box payments and then other batch payments.

A processing method according to a preferred embodiment of the invention includes the steps of receiving payments and generating batch payment data at a receiving facility. The batch payment data is transferred to a central facility and is converted to transaction data. The transaction data is then moved to a temporary queue and is assigned to transaction routers and to individual payment drivers. Next, the information in individual accounts located in the master files is updated by the payment drivers based on the payments reflected in the payment transaction data. With the method, a completion time for each payment driver is monitored and a number of drivers which are permitted to be active is controlled based on the monitored completion times.

With the method according to the invention, the processing of payment transaction data can occur in conjunction with the provision of customer service and other types of account services. The monitoring of the completion times allows the speed of the system to be controlled in a such a way that the processing of the payment transaction data does not prevent the account services from accessing the master files. The monitoring, furthermore, occurs a regular intervals, such as every twenty milliseconds, which enables the speed of the process to be continuously monitored. Since the payment process can occur simultaneously with account services such as customer service, the payments may be processed during normal day-time hours and need not wait until late at night. The method also includes steps of classifying the payments into priority groups and beginning the processing with those transactions having the highest priority.

DETAILED DESCRIPTION OF THE PREFERRED EMBODIMENT

Reference will now be made in detail to the preferred embodiment of the invention, an example of which is illustrated in the accompanying drawings. The invention is described with reference to a system 10 for use in a financial institution to track mortgage payments applied to individual accounts. It should be understood, however, that the invention can be applied to other types of accounts, such as to accounts for financing mobile homes, automobiles, or student loans.

Figure 1:
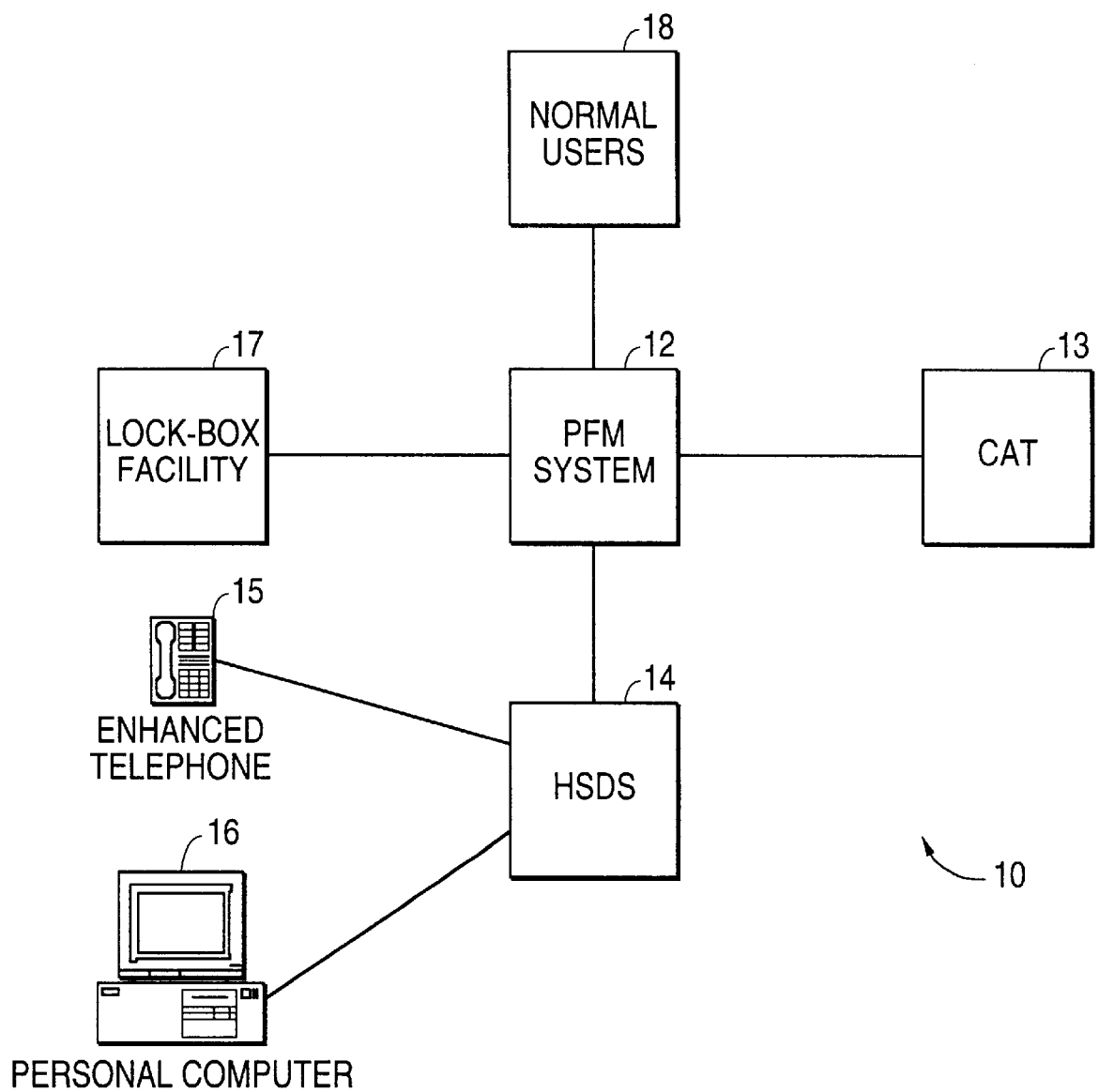
FIG. 1 is a block diagram of the processing system according to a preferred embodiment of the invention.

With reference to FIG. 1, a processing system 10 according to a preferred embodiment comprises a process facility management (PFM) system 12 for receiving mortgage payment data received from a plurality of different sources. These sources include a customer activated terminal (CAT) 13, which is a particular type of automated teller machine (ATM), an enhanced telephone 15, a personal computer 16, and at least one lock-box facility 17. Each of these sources 13 and 15 to 17 may be used for some more traditional functions, such as transferring funds between checking and savings accounts, and can also perform some more non-traditional functions, such as bill payment, information retrieval, and transferring funds between money market accounts, checking accounts, and savings accounts. The transactions originating at the CAT 13 are processed directly by the PFM system 12 while the transactions originating at the enhanced telephone 15 and personal computer 16 are processed by the PFM system 12 indirectly through a home services delivery system (HSDS) 14.

The CAT 13 is a particular type of ATM built for the assignee and its affiliates by Citicorp Transaction Technology and the HSDS 14 is a proprietary service platform for providing an interface between the enhanced telephone 15 and the personal computer 16. The CAT 12 and the HSDS 14, however, may be replaced with any suitable type of ATM or service platform, respectively. The enhanced telephones have been developed by an affiliate of the assignee, examples of which are described in U.S. Pat. Nos. 4,991,199; 5,088,927; 5,195,130; and 5,321,840, which are hereby incorporated by reference.

The lock-box facility 17, in general, is a well known facility for receiving payments and for transmitting the payment data to a processing facility. While the lock-box 17 may comprise only a single lock-box, the processing system 10 preferably comprises a plurality of lock-boxes 17 which are located at various locations throughout a geographic region. The lock-boxes 17 receive payments in the mail and have scanning equipment for acquiring account information from the contents of the mail, namely payment coupons and enclosed checks. The lock-boxes 17 collect the account information in batch-form and transmit this data to the PFM system 12. Whereas previous lock-boxes typically transmitted their batch data to a processing facility only once at the end of a day, the lock-boxes 17 according to the invention preferably transmit the batch payment information at much more frequent intervals throughout the day. For instance, the lock-boxes 17 may transmit at regular intervals, such as every two hours, or may alternatively transmit once a certain amount of payments have been received, such as ten thousand payments. By transmitting more frequently, the processing system 10 can more quickly update account information based on the received payments.

The normal users 18 of the processing system 10 include those people who must access account information so as to provide customer service or to provide other types of mortgage processing. The normal users 18 are on-line users of the PFM system 12 which require approximately real-time access to the account information so as to provide substantially real-time service to the customers. The normal users 18 of the system 10 generally work between the hours of 7:00 a.m. and 6:00 p.m. and thus present their heaviest load to the system 10 during these hours.

Figure 2:
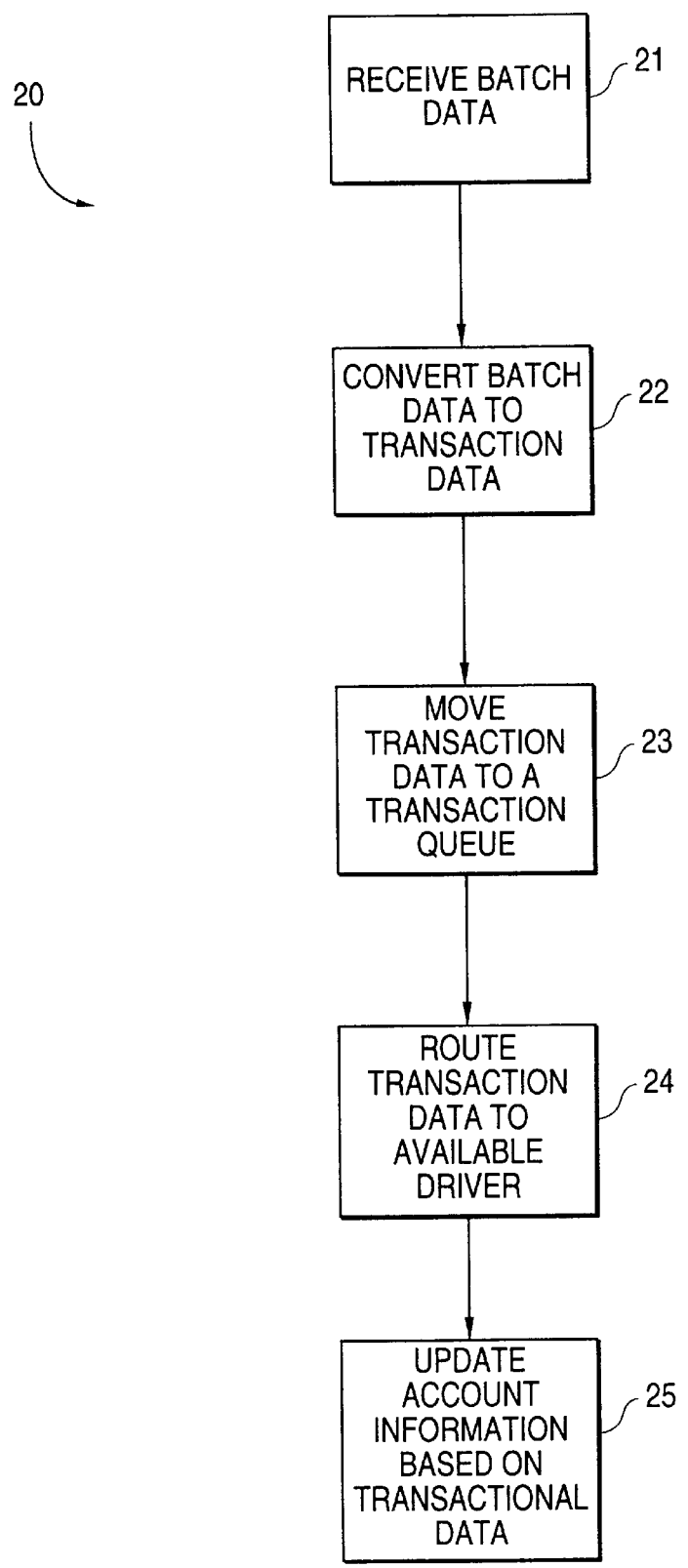
FIG. 2 is a flowchart of a processing method according to a preferred embodiment of the invention.

A method 20 generally illustrating operations of the PFM system is shown in FIG. 2. At a step 21, data is received in batch form, such as from the lock-box facility 17. Next, at step 22, the batch data is converted into transaction data and, at step 23, the transaction data is moved to a transaction queue. The transaction data is routed at step 24 to an appropriate driver which, at step 25, updates account information according to the received transaction data The method 20 for processing the mortgage payment data occurs in conjunction with on-line processing, such as the customer service and other mortgage services. These services, however, are not halted due to the processing of the payment data and updating of the account information but, as will be become apparent from the description below, occur without any serious interruptions in service.

Figure 3:
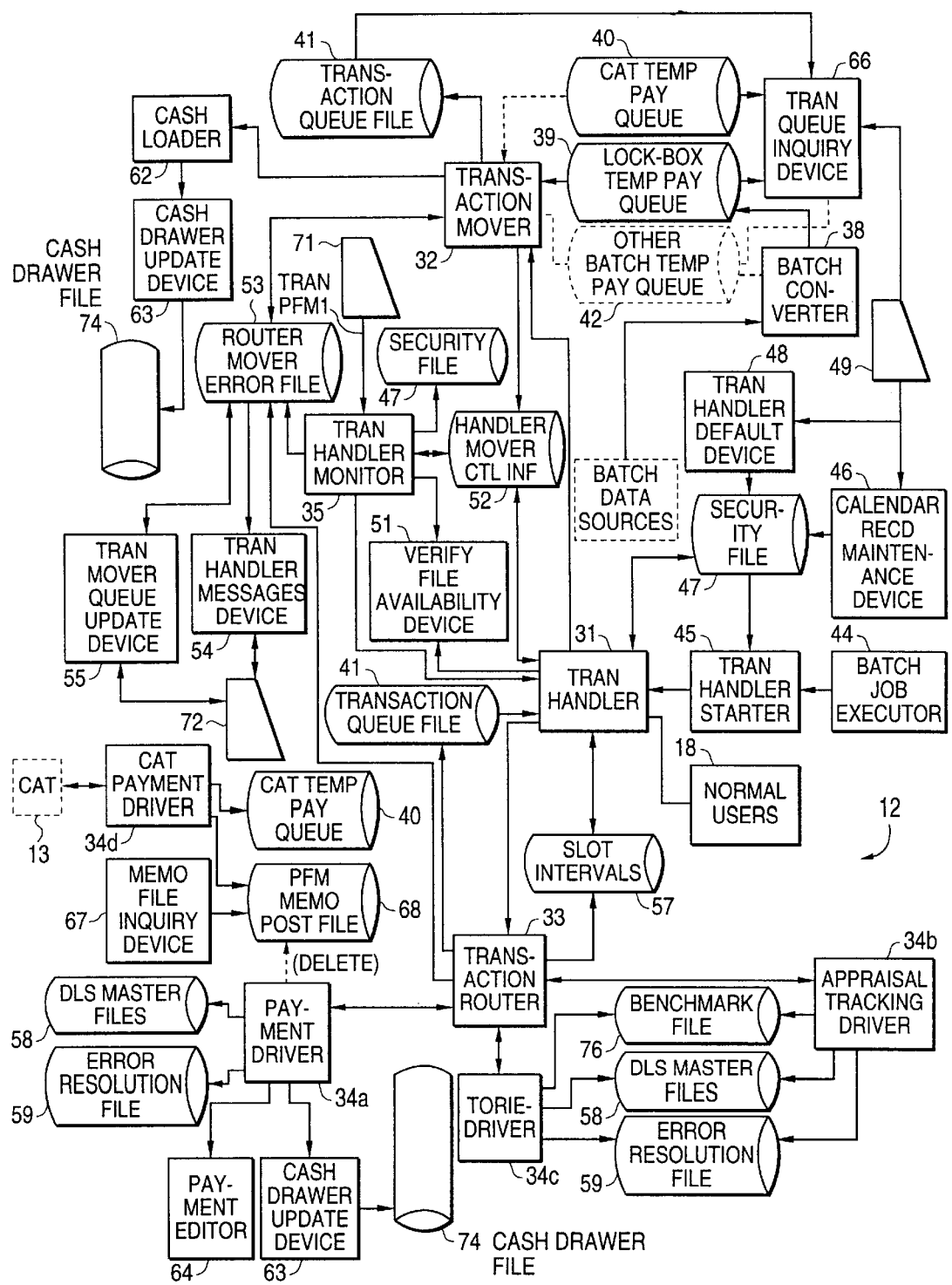
FIG. 3 is a block diagram of the processing system shown in FIG. 1.

A detailed diagram of the PFM system 12 is shown in FIG. 3. To simplify the diagram, some of the data files have been illustrated in more than one place so that the data files may be placed in close proximity to the devices that access those files. The PFM system 12 is an asynchronous processing system comprised of a transaction handler 31, a transaction mover 32, a transaction router 33, drivers 34, and a transaction handler monitor 35. In general, the handler 31 determines when data is available for processing within the PFM system 12. The handler 31 selectively starts the transaction mover 32 and assigns transactions to specific transaction routers 33 and the transaction mover 32 transfers data from temporary queue files to a transaction queue file. The router 33 accepts transactions assigned by the handler 31 and presents them from the transaction queue to an appropriate driver 34. The drivers 34 comprise different types of drivers 34 for different types of transactions with each driver 34 processing a transaction and updating the account information. The drivers 34 process one transaction at a time and inform the router 33 whether the update was successful. When the update is successful the router 33 deletes the transaction from the transaction queue. The transaction handler monitor 35 tracks the consumption of resources by the PFM system 12 and provides speed control so that the normal users 18 can continue to obtain on-line services with only minimal delays.

Figure 4:
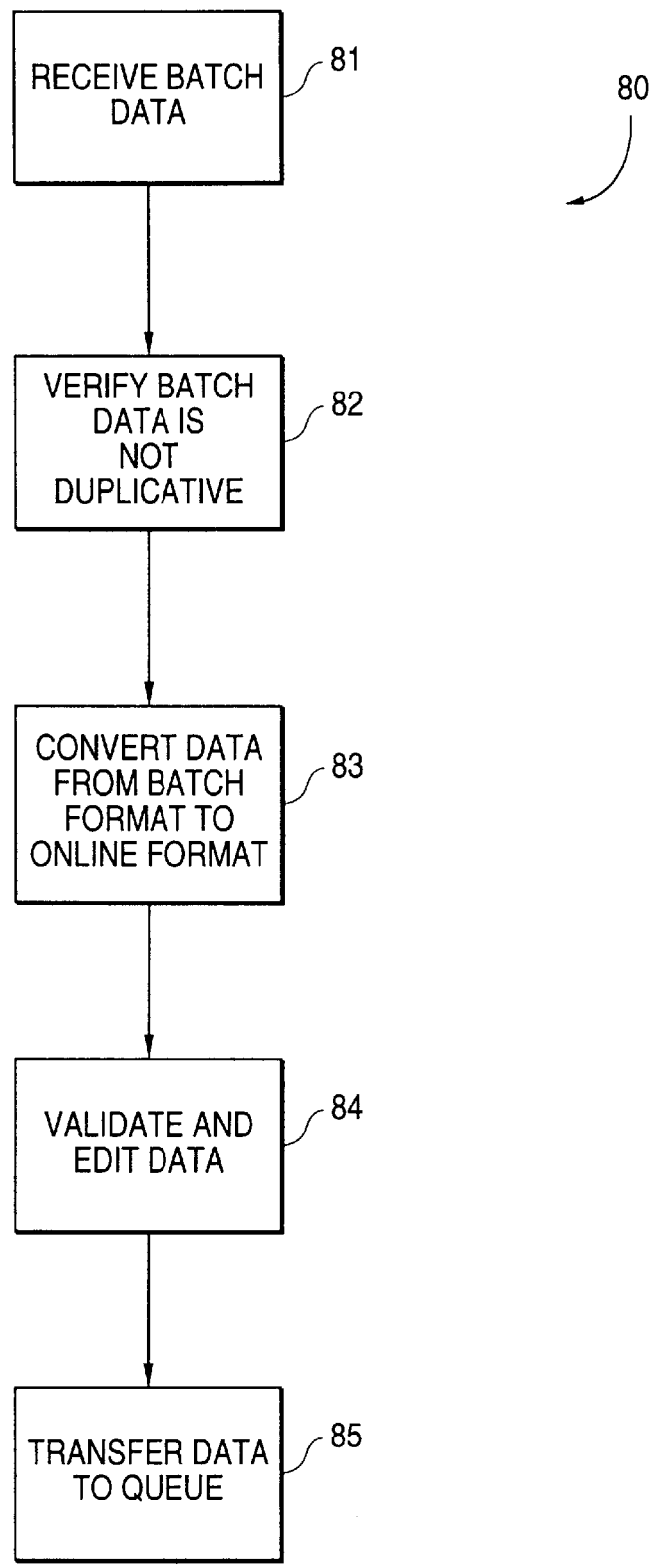
FIG. 4 is a flowchart for converting batch data to transaction data.

The batch data from the lock-box facilities 17 and from other batch data sources is received at a batch converter 38 which converts the data from a batch format to a transaction format. FIG. 4 provides a flowchart of the general operations of the batch converter 38. After the batch data is received at step 81, the batch converter 38 verifies at step 82 that the data is not duplicative of data which has already been received. Next, at step 83, the batch converter 38 converts the data from the batch format to the transaction on-line format. The batch data typically arrives in a format with account and payment information for all of the accounts followed by a single entry of the date covering all of the payments. The batch converter 38 reformats the data so that the information for each account includes not only the account number and payment amount but also includes the effective date of the payment. After converting the data format, the batch converter 38 validates and edits the transaction data at step 84. During this step 84, the batch converter 38 performs such functions as determining whether the account is an existing account, determining whether the payment amount is the amount due, and determining whether the payor is not in bankruptcy. As a last step 85, the batch converter 38 transfers the transaction data to temporary pay queues, such as lock-box temporary pay queue 39, CAT temporary pay queue 40, and other batch temporary pay queue 42.

Figure 5:
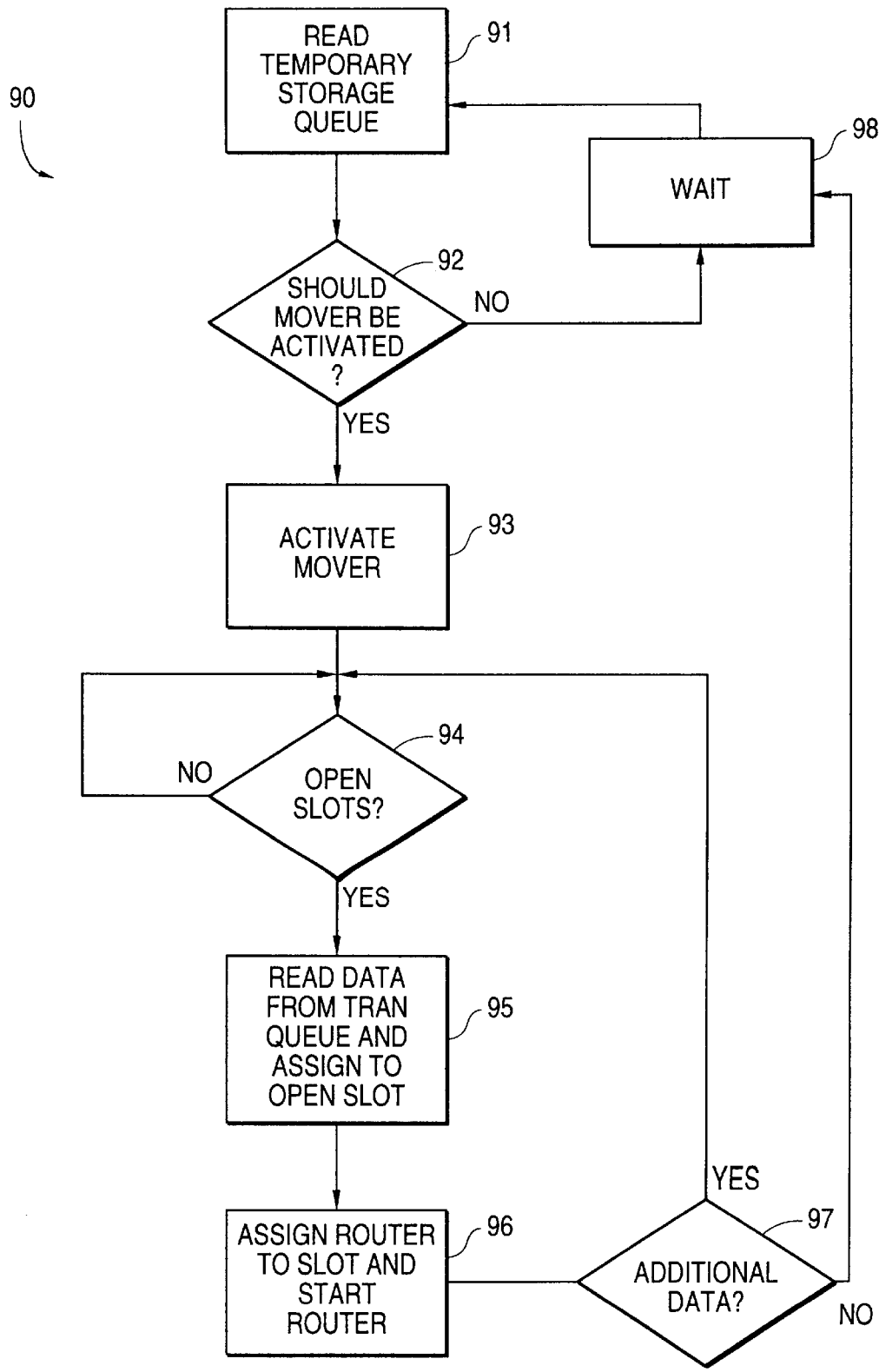
FIG. 5 is a flowchart of operations for the handler shown in FIG. 3.

The transaction handler 31 in the PFM system 12, more specifically, is an asynchronous unit for controlling the mover 32 and the routers 33 and maintains a temporary storage queue within a handler mover control interface file 52. The handler 31, with reference to FIG. 5, reads this temporary storage queue at step 91 and, based on the information in the temporary storage queue, determines at step 92 whether the mover 32 should be activated. The mover 32, as discussed above, transfers files from temporary pay queues to a transaction queue 41 and is preferably placed in a wait state once all files have been transferred. The handler 31 will wake the mover 32 at regular intervals which are specified within the temporary storage queue located in the handler mover control interface file 52. The handler 31 preferably activates the mover 32 every five minutes, but may alternatively activate the mover 32 at a greater or lesser interval of time. If the mover 32 should not be activated, as determined at step 92, then processing continues to step 98 at which time the handler 31 will become idle. Each time that the handler 31 is reactivated, the processing returns to step 91 so that the handler 31 can once again read the temporary storage queue and detect any change to the temporary storage queue.

The router 33, as discussed above, is generally responsible for assigning transactions to specific drivers. The router 33 preferably comprises a plurality of routers 33, the number of which is controlled by the handler 31. The handler 31 determines the number of routers 33 which may be active at one time based on the information read from the temporary storage queue within the handler mover control interface file 52. The routers 33 trap all abend conditions either of itself or its corresponding drivers 34. When an abend condition occurs, the router 33 will pass information to the handler 31 to ensure that no additional routers 33 are started so that all transactions will remain on the transaction queue file 41 until the abend can be repaired. As will become apparent from the description below, the number of routers 33 is altered in order to selectively control and limit the speed of consumption by the processing system 10. By limiting and controlling the number of active routers 33, the normal users 18 of the system 10 can continue to perform their services while the PFM system 12 processes the mortgage payment information and updates the account information.

In order to track the active routers 33, the handler 31 maintains a set of slots within a slot intervals storage file 57 with each slot representing an active router 33. Depending upon the load to the PFM system 12, as many as one hundred twenty slots or more may be filled, thereby corresponding to an equally large number of active routers 33. The handler 31, at step 94 determines whether any slots are available. If no slots are available, then the handler 31 will wait at step 94 until a slot becomes available. With at least one slot available, the handler 31 next reads the transaction data from the transaction queue 41 and assigns the transaction data to the open slots. At step 96, the handler 31 assigns a router 33 to the slot and activates the router 33. The handler 31 next determines, at step 97, whether additional transaction data needs to be assigned to a router 33. If so, then the handler 31 returns to step 94 and waits for a slot to become available for the additional data. If, on the other hand, all transactions have been processed, then the handler 31 waits in an idle state at step 98. Thus, the handler 31 continuously updates the slots as the routers 33 complete their tasks and become available and as the routers 33 become assigned to specific transaction data.

Rather than routing only a single record to each router 33, the handler 31 preferably transfers a vertical group of records from the transaction queue file 41 to each router 33 Each vertical transaction group comprises a plurality of records, such as three records, and are transferred to the router 33 as a group package. By placing the transactions into vertical groups, the amount of processing incurred by the handler 31 in handling the transactions is reduced, thereby reducing the overall processing overhead within the PFM system 12 and increasing the speed and efficiency of the PFM system 12

Figure 6:
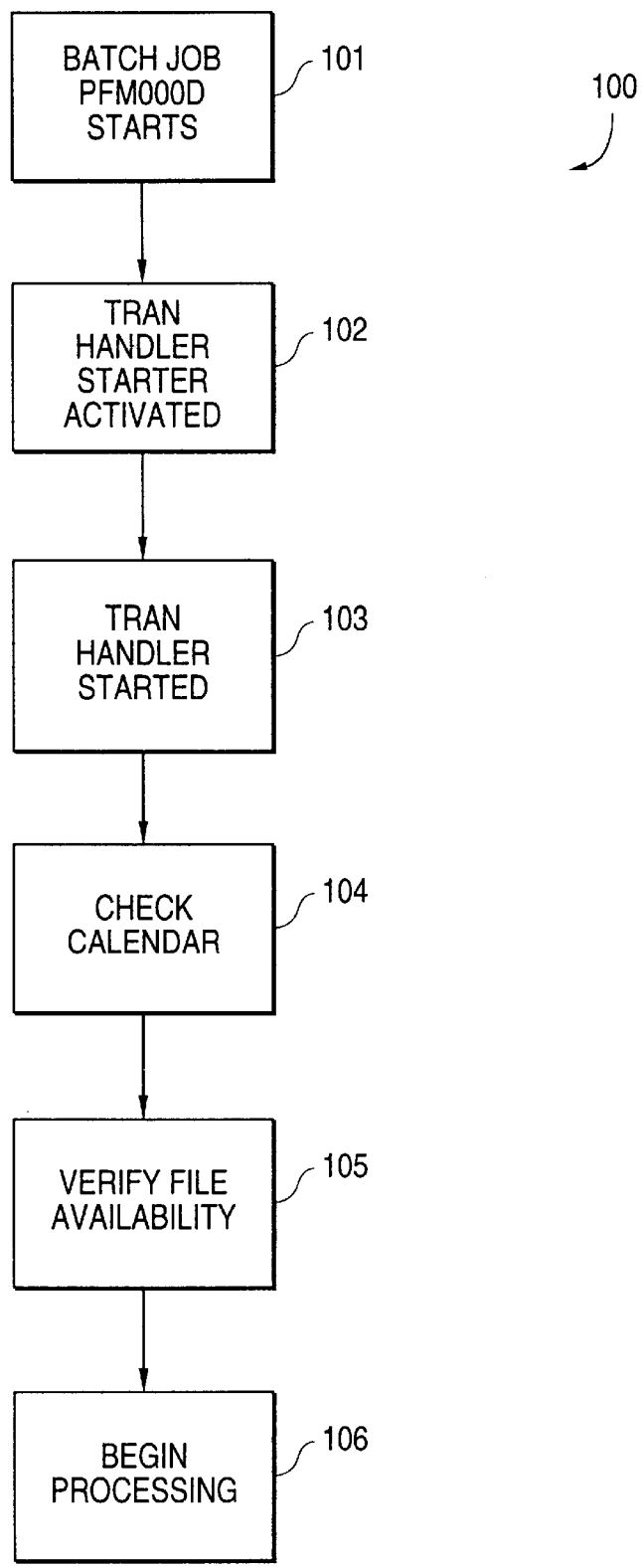
FIG. 6 is a flowchart of operations for a start-up routine of the handler.

A method 100 by which the PFM system 12 and the handler 31 start-up will now be described with reference to FIG. 6. At step 101, a batch job executor 44 performs a number of batch jobs, such as batch jobs for initializing the operations of the PFM system 12. After all batch jobs have completed, a transaction handler starter 45 is activated in order to start the handler 31. Once the handler 31 is started, the handler 31 will read the calendar records from a security file 47 and determines whether the present date and time are within the start and stop times indicated by the calendar records. If the present time and date are outside the permissible range of operating times, then the handler 31 will become inactive. For instance, if the calendar records only permit weekday operations of the handler 31 and the handler 31 is started on a weekend, the handler 31 will conclude from the calendar records that it must halt operations and become inactive. On the other hand, if the present time and date permit the operation of the handler 31, then the handler 31 will activate a verify file availability device 51 to verify that all files needed for processing the payment data are available. The verify device 51 performs this verification by attempting to read all of the necessary data files. When the verify device 51 is unable to read any one of the necessary files, the verify device 51 will report this inability to the handler 31. Since any processing by the handler 31 will likely encounter a critical error when one of the necessary files is unavailable, the handler 31 will not initiate processing of the transaction data but will instead become inactive. If all files are available and if the present time and date are within the permitted start and stop times reflected in the calendar records, then the handler 31 begins the processing of transaction payment data and other processing functions at step 106. The handler 31 will then process the transaction data until all of the data has been processed, at which time the handler 31 will become inactive by executing a CICS DELAY command. In accordance with the method 90 shown in FIG. 5, the handler 31 will read the temporary storage queue in the handler mover control interface file 52 upon being reactivated and will activate the mover 32 at the intervals specified in the file 52.

The security file 47 is a KSDS VSAM file and contains default information which is transferred to the handler mover control interface file 52. The handler 31 uses this default information, inter alia, to control when the handler 31, mover 31, and routers 33 are activated and deactivated and, for the routers 33, the number of routers 33 which may be active at a time. In response to manual inputs 49 to a CICS on-line screen, a transaction handler default device 48 can modify the default values. Since the default values are transferred to the handler mover control interface file 52 during start-up, any change in the default values through the transaction handler default device 48 will not become effective until the handler 31 is restarted. The information in the handler mover control interface file 52 may also be altered dynamically by routing manual inputs from an input/output device 71 to the transaction handler monitor 35.

The transaction mover 32 transfers data from temporary transaction queues, namely the lock-box temporary pay queue 39, the CAT temporary pay queue 40, and the other temporary pay queue 42, to the transaction queue file 41. The lock-box temporary pay queue 39 is an entry sequence data set (ESDS) virtual storage access method (VSAM) file that contains all batch lock-box payments transferred by the batch converter 38. A temporary other transaction pay queue 42 is also an ESDS VSAM file but contains other types of transactions transferred by the batch converter 38. These other types of transactions include, but are not limited to, appraisal tracking transactions and TORIE transactions. The transaction queue 41 is a KSDS VSAM file which contains all lock-box and CAT payments copied from the temporary payment queues 39, 40, and 42. The transaction mover 32, as well as the PFM system 12, is not limited to just three temporary transaction queues 39, 40, and 42, but may interact with additional temporary queues.

Figure 7:
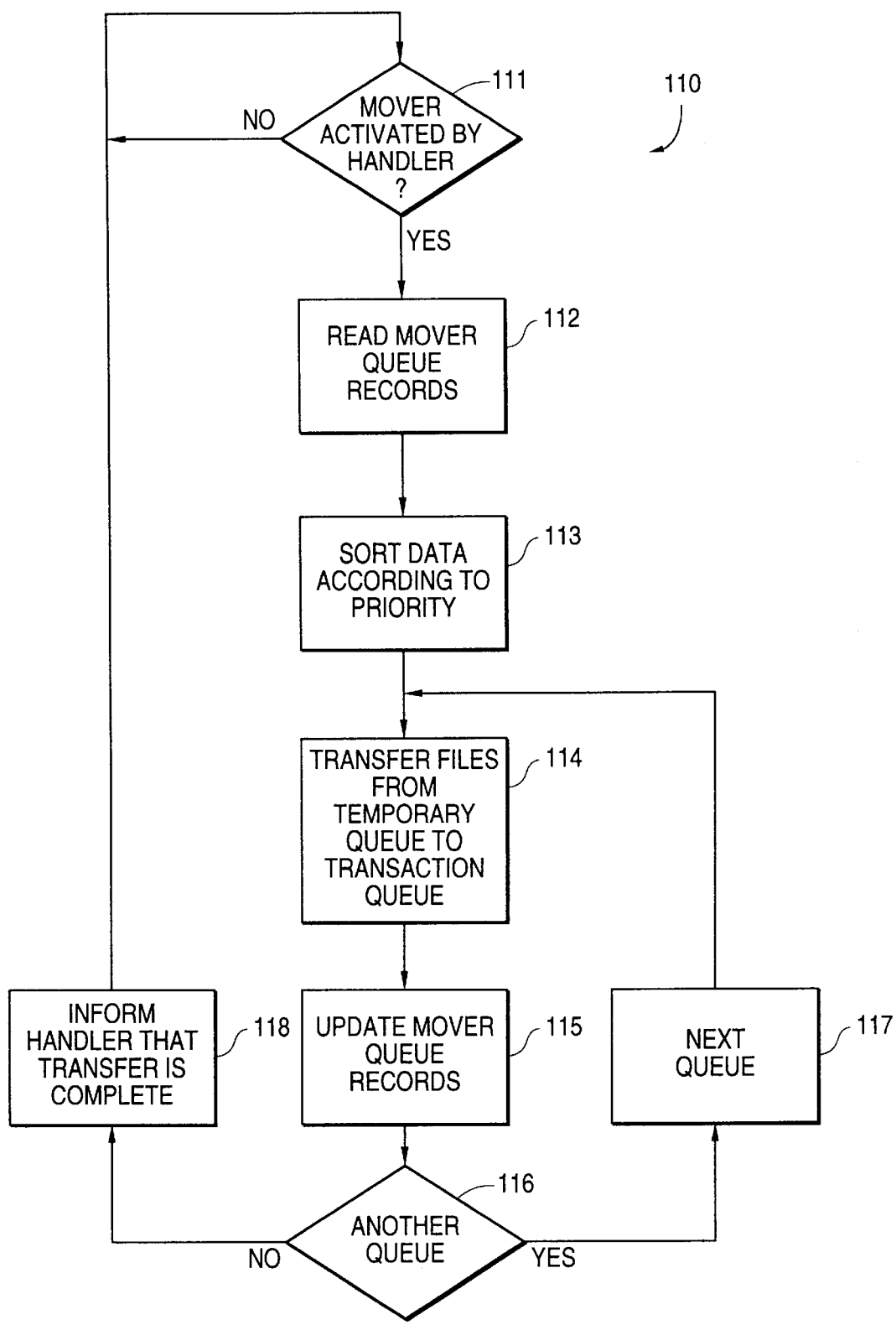
FIG. 7 is a flowchart of operations for the mover shown in FIG. 3.

A method 110 of operation for the mover 32 is generally shown in FIG. 7. The mover 32 remains in a wait state at step 111 until the handler 31 activates the mover 32. As discussed above, the handler 31 activates the mover 32 at intervals specified by the temporary storage queue stored in the handler mover control interface file 52. After the mover 32 is activated, the mover 32 will read mover queue records at step 112. The mover queue records are stored in a router/mover error file 53 and contain information for determining, inter alia, the order in which the temporary queue files will be processed. The mover 32 internally sorts these files in a table based on priority codes, with the files having lower priority code numbers being processed before the files with the higher priority code numbers. A priority code of "S" can be used to skip a queue completely. The priority codes for the queues can be changed by altering the mover queue records using a transaction mover queue update device 55 and an input/output device 72. Any change in the priority codes will not become effective until after the next time the mover 32 is started.

In the preferred embodiment, the transactions can be classified into three different priority groups. The first group, having the highest priority, is dedicated to CAT payments Since the customer is waiting at a CAT or other ATM for a transaction receipt, these CAT payments should be processed as quickly as possible in order to reduce the time that the customer must wait for the receipt. The middle priority group is reserved for the high volume batch transactions received from the lock-box facility 17 and the low priority group of transactions is reserved for other transactions received in batch form. Although the transactions have been classified into only three priority groups, the transactions could alternatively be grouped into a greater or lesser number of groups.

At step 114, the mover 32 transfers files from the temporary pay queues 39, 40, and 42 to the transaction queue 41 according to the relative priority between the queues. The mover 32 first turns to the temporary pay queue having the highest priority and reads all transactions which are located after the last file read during a previous transfer by the mover 32. A relative byte address (RBA) of the last file read by the mover 32 is stored in the mover queue record and is read by the mover 32 at step 112. Thus, at step 114, the mover 32 reads all files after the RBA stored in the mover records queue and then writes these files to the transaction queue file 41. Next, at step 115, the mover 32 updates the mover records queue in the router/mover error file 53 by writing the new RIBA for the last record transferred by the mover 32. If any one of the files cannot be opened, the mover 32 will update the handler mover control interface file 52 with a status of "WAITING" and the mover 32 will remain inactive until it's next start-up time. If an I/O error occurs during the transfer operation, the mover 32 will update the handler mover control interface file 52 with a status of "STOPPED." At step 116, the mover 32 determines whether additional queues have files that need to be transferred. If one or more queues do have files that need to be transferred to the transaction queue 41, then the mover 32 turns to the queue having the next highest priority at step 117 and returns to step 114 to transfer these files. If on the other hand, all queues have been processed by the mover 32, then at step 118 the mover 32 informs the handler 31 that the transfer of files from the temporary pay queues to the transaction queue 41 has been completed. The mover 32 informs the handler 31 at step 118 by writing a status of "DONE" for the mover 32 within the handler mover control interface 52 file. At this point in the method 110, the mover 32 remains inactive at step 111 until the handler 31 once again activates the mover 32.

Before transferring the files to the transaction queue 41 at step 114, the mover 32 also provides any special handling which might be specified within the mover queue records. For instance, with payments, the mover 32 passes each record in each queue to a cash loader 62. The cash loader 62 performs special processing by summing the total amount of payments within each batch. The cash loader 62 generates a batch header and payment total and supplies this information to a cash drawer update device 63. The cash drawer update device 63 maintains a cash drawer file 74 so as to perform a cash balancing process between the total amount of the payments received in batch and transferred by the mover 31 and the total amount of the payments processed by the various drivers 34. After all processing has been completed for a batch, these two amounts are compared to each other to detect any discrepancies. The cash drawer update device 63 is the only device that can directly access the cash drawer file 74.

Figure 8:
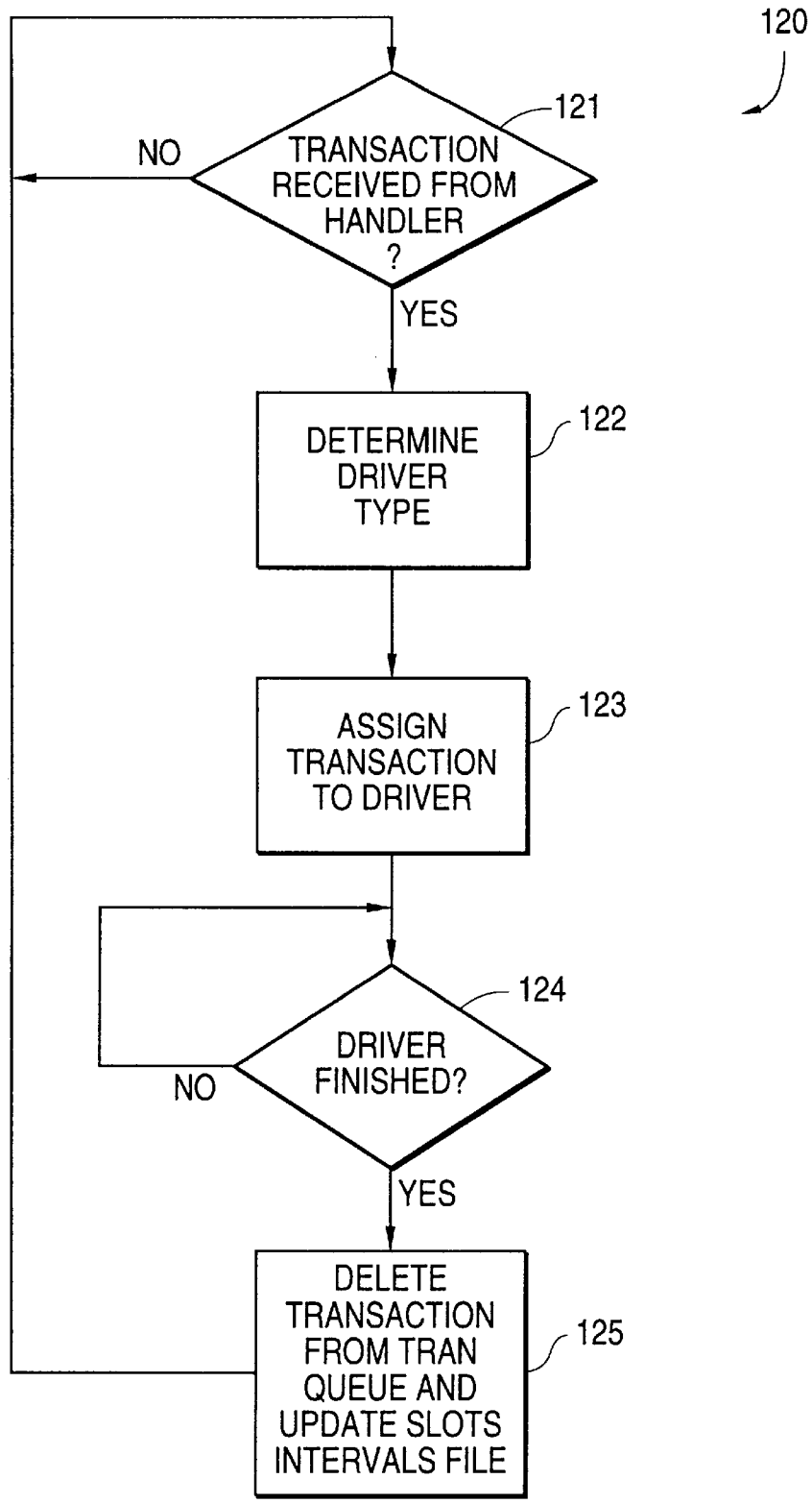
FIG. 8 is a flowchart of operations for the router shown in FIG. 3.

A method 120 of operation for the routers 33 is generally shown in FIG. 8. The method 120 includes a step 121 of receiving a transaction from the handler 31. As discussed above, the handler 31 controls the number of router 33 which may be active at any one time and also supplies the routers 33 with the transactions in vertical groups. After a router 33 receives a transaction or group of transactions from the handler 31, the router 33 next determines the type of driver 34 needed to process the transaction. The preferred embodiment has four types of payment drivers: a payment driver 34a, an appraisal tracking driver 34b, a TORIE driver 34c, and a CAT payment driver 34d. It should be understood, however, that the PFM system 12 may include additional drivers 34 of the same type or of different types.

At step 123, the router 33 passes each transaction to the appropriate one of the drivers 34. When the handler 31 sends a vertical group of transactions to a router 33, the router 33 will pass the transactions one-by-one to the appropriate driver 34. If the driver 34 successfully processes the transaction, as determined at step 124, the router 33 will delete the transaction from the transaction queue file 41 at step 125. The router 33 will also update the slot for the just-completed transaction by writing the time elapsed in processing the transaction by the driver 34 into the slots interval file 57. When the router 33 receives a vertical group of transactions, the router 33 will wait until all transaction are processed before updating the appropriate slot within the slots interval file 57. As will become apparent from the description below, the elapsed times for the transactions are used by the handler 31 to determine throughput. If a transaction is not successfully processed by a driver 34, the router 33 will write an error record to the router/mover error file 53 and the router 33 will leave the transaction on the transaction queue file 41.

Figure 9:
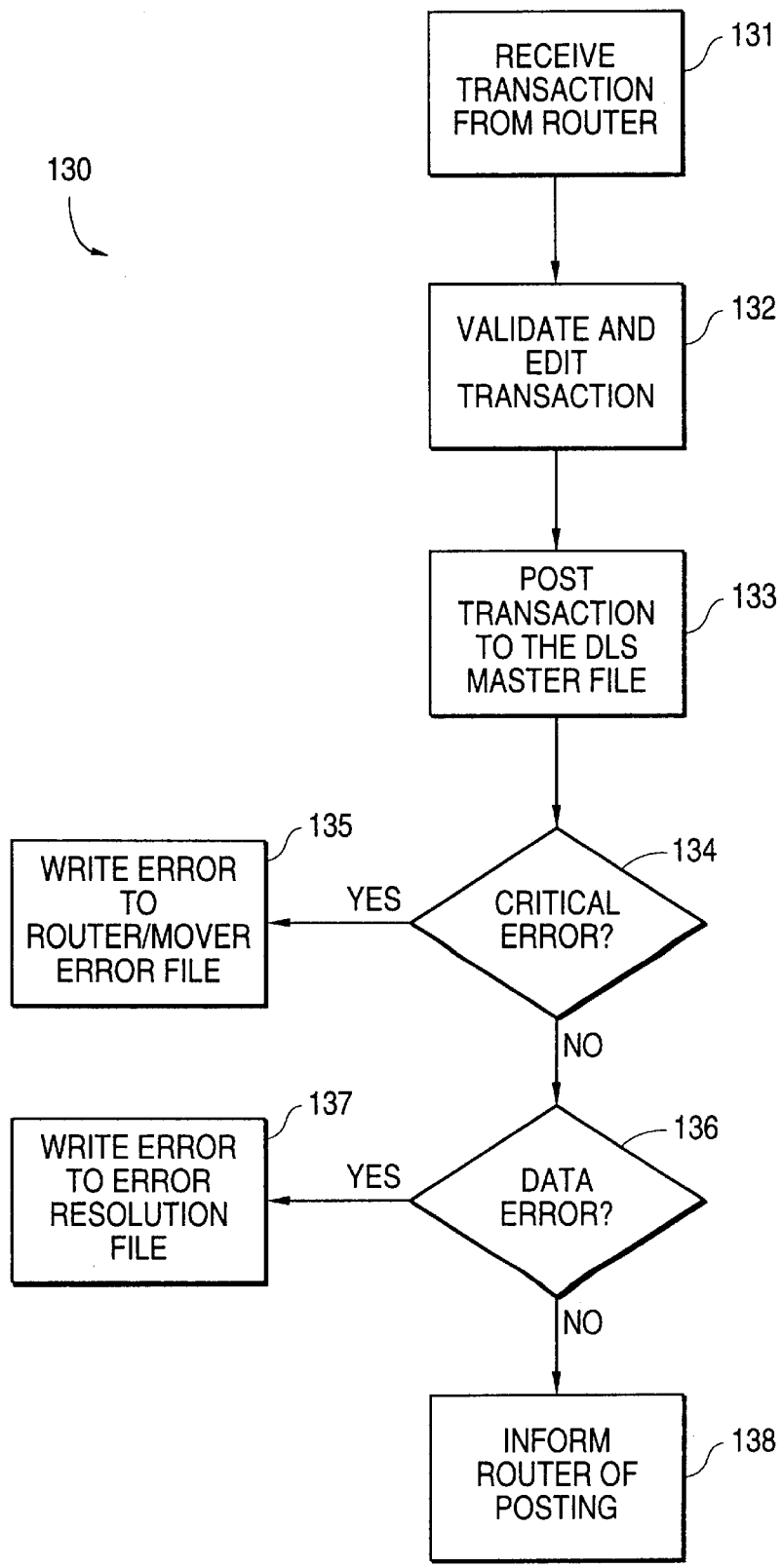
FIG. 9 is a flowchart of operations for the driver shown in FIG. 3.

A method 130 generally illustrating operations of the drivers 34 will now be described with reference to FIG. 9. After the driver 34 receives a transaction from a router 33 at step 131, the driver 34 validates and edits the transaction at step 132. At step 132, the driver 34 performs some of the same editing and validating that was already performed when the files were placed in temporary pay queues, such as by the batch converter 38. For the payment driver 34a and CAT payment driver 34d, this editing is performed by a payment editor 64 which both edits and distributes payment transactions. The validate and edit step 132 is a necessary step since the status of the account might have changed from when the files were placed in the temporary pay queues. The validation and editing at the batch converter 38, on the other hand, may be eliminated in view of this process being performed by the drivers 34. Next, at step 133, the drivers 34 post the transaction to the set of master files 58 which contain all of the information for the various accounts. If a critical error occurs during the posting, as determined at step 134, the router 33 will write an error record to the router/mover error file 53 and the router 33 will stop operations. If a data error occurs during the posting, the driver 34 will write an error record to an error resolution file 59 and the router 33, in this situation, will continue to operate. When no errors are encountered, the driver 34 will inform the router 33 that the posting of the transaction was successful at step 138.

The payment driver 34a, more specifically, handles what are considered regular payments to the mortgage accounts received through the lock-box facility 17. The payment driver 34a, in addition to the functions described with reference to FIG. 9, also activates the cash drawer update device 63 to either post or back-out detail cash amounts from the cash drawer file 74 based on whether the payment transaction processed by the driver 34a was successfully posted to the master files 58. Thus, if the posting was successful, the cash drawer update device 63 will sum the posting with a running totals of all postings for the particular batch. By recording both the total amount posted by the payment driver 34a and the total amount loaded into the cash drawer file 74 by the cash loader 62, the PFM system 12 can ensure that all payments have been processed. In all, through the payment driver 34a and cash drawer update device 63, the cash drawer file 74 maintains records of all transactions which are entered, all transactions which are rejected, all transactions which are posted, the total amount of cash entered, the total amount of cash rejected, and the total amount of cash posted.

Figure 10:
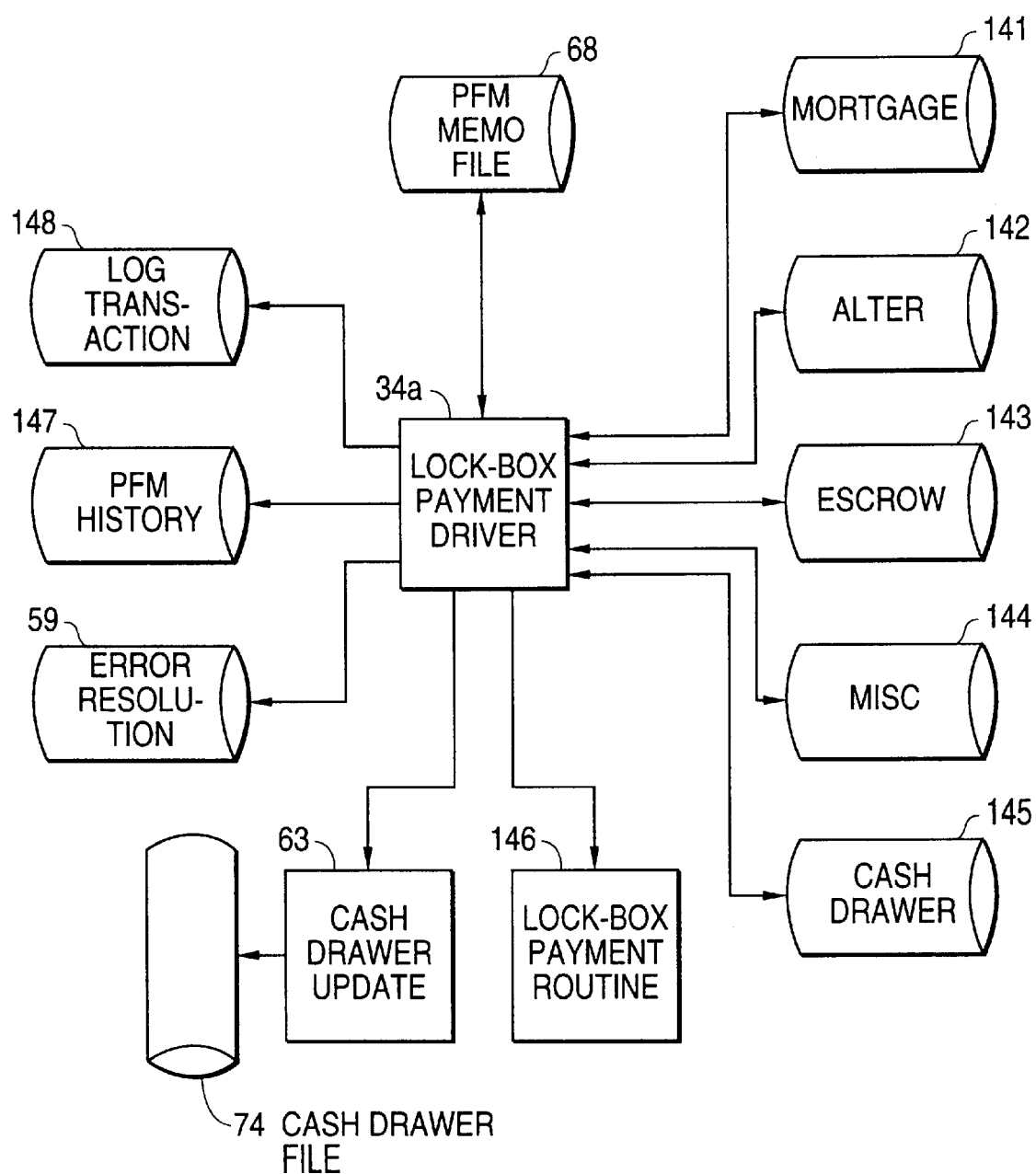
FIG. 10 is a block diagram of the payment driver shown in FIG. 3.

The functions of the payment driver 34a will now be described in more detail with reference to FIG. 10, which shows a partial view of the PFM system 12. The payment driver 34a receives transaction data from the router 33 with this transaction data including information directed to the principal, interest, escrow and other miscellaneous items making up a monthly mortgage obligation. Because these various portions of the mortgage payment must be tracked, the DLS master files 58, shown in FIG. 3, are comprised of the various files shown in FIG. 10. These files include a KSDS VSAM mortgage file 141 for containing account-level mortgage information, a KSDS VSAM alter file 142 for containing account-level adjustable rate mortgage information, a KSDS VSAM escrow file 143 for containing account-level escrow information, a KSDS VSAM miscellaneous file 144 for containing account-level miscellaneous mortgage information, a KSDS VSAM PFM history file 147 for containing daily financial transactions, and an ESDS VSAM log file 148 for containing daily transactions entered through PFM matrix processing or through on-line DLS transactions. The PFM, history file 147 is a read-only file in the on-line environment and contains the updates only until on-line operations are terminated. During nightly batch processing, the history file 147 is emptied while the transactions in the log file 148 are added to the history file 147.

In addition to the master files 58, as stated above, the payment driver 34a also accesses a PFM memo file 68 and the error resolution file 59. The PFM memo file 68 will be described in more detail below with reference to the processing of transactions received from a CAT 13. The error resolution file 59 is a KSDS VSAM file containing two record types used in the processing and the on-line correction of processing. The first type is error records which track the transactions that have failed the edits performed by the payment driver 34a, the appraisal tracing driver 34b, the TORIE driver 34c, or the CAT payment driver 34d. These error records are exact duplicates of the transactions from the transaction queue file 41. The payment error records can be resubmitted or deleted during an on-line PFM error resolution process while the two other transactions are used only for on-line display and batch reporting. The second type of records is log records which track the payment error records that were resubmitted or deleted in the on-line PFM error resolution processing. Both of these records are reported and deleted from the file in nightly batch processing.

The appraisal tracking driver 34b and the TORIE driver 34c process one transaction at a time from the vertical transaction group associated with a calling router 33 and informs the router 33 whether the processing was successful. In general, the appraisal tracking driver 34b and the TORIE driver 34c handle updates to a benchmark file 76 sent from some of the other users, namely a LAN subsystem via TCP/IP. The benchmark file 76 is a KSDS VSAM file that contains benchmark data entered on-line or updated from the appraisal tracking driver 34b or the TORIE driver 34c. The transactions handled by the appraisal tracking driver 34b and the TORIE driver 34c are appraisals and other real estate owned property, respectively.

Figure 11:
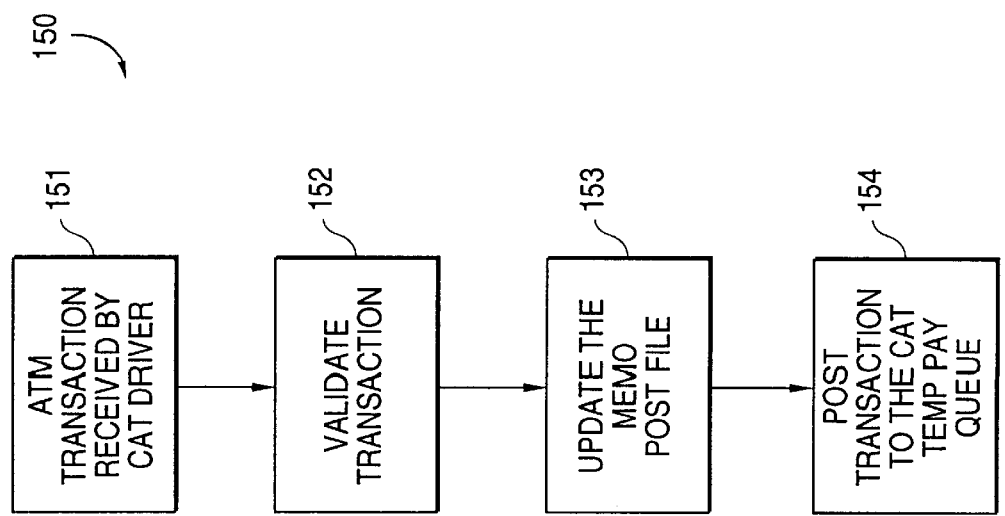
FIG. 11 is a flowchart of operations for a CAT transaction.

A method 150 generally illustrating the processing of mortgage payments received by a CAT 13 is shown in FIG. 11. The transactions received by a CAT 13 are handled differently than other payments, such as from a lock-box facility 17, since the payor or customer requires some type of receipt quickly from the PFM system 12 and, moreover, quickly requires this receipt at any time of the day. At step 151 of the method 150, the transaction from the CAT 13, or from any other suitable ATM, is received by the CAT payment driver 34d. As with the other drivers 34, at step 152 the CAT payment driver 34d validates and edits the transaction to ensure, inter alia, that the amount paid is the amount due and that the payor is not in bankruptcy. Next, at step 153, the CAT driver 34d writes a record to the memo post file 68, which is a KSDS VSAM file, and then, at step 154, posts the transaction to the CAT temporary pay queue 154. The master files 58 are placed in a read-only mode during CICS batch processing, whereby any update to accounts must be posted to the memo post file 68 to allow the customer to see the results of their payments immediately. When the handler 31 and subsequently the payment driver 34a are later activated, the payments will be transferred from the CAT temporary pay queue 40 to the transaction queue 41 by the mover 32, will be assigned to one or more routers 33, and will then be processed by the payment driver 34a and permanently posted to the master files 58. After the payment driver 34a successfully posts the CAT transaction to the master files 58, the payment driver 34a deletes the CAT transaction from the memo post file 68.

Figure 12:
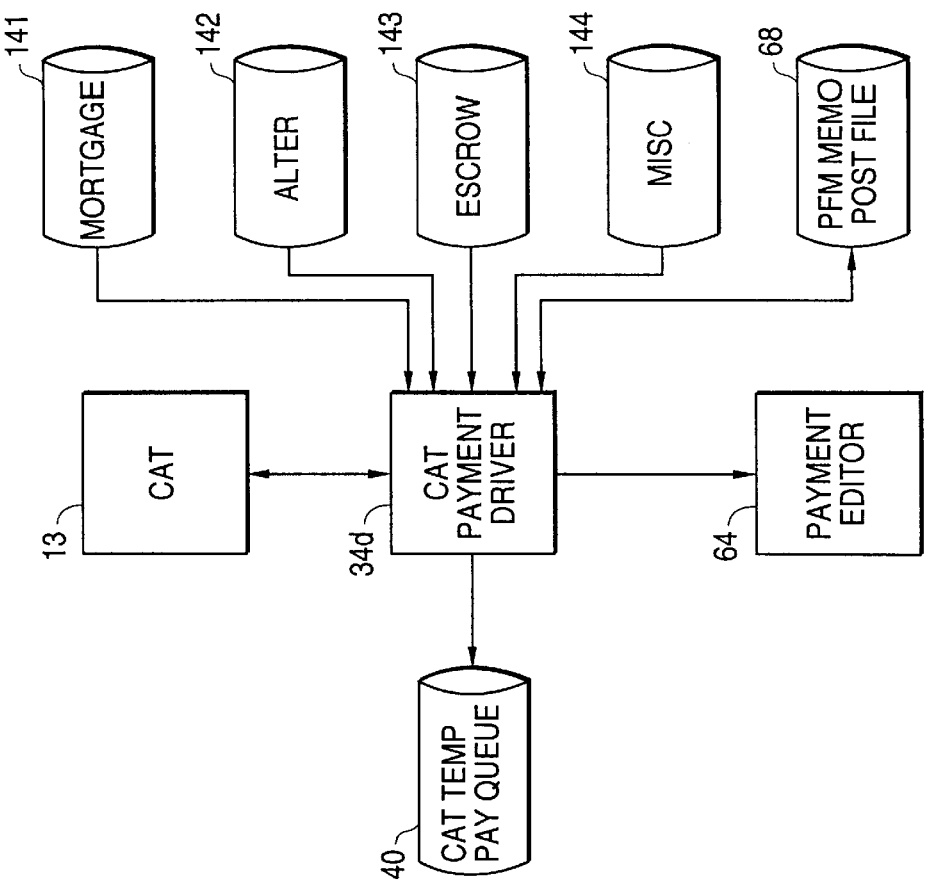
FIG. 12 is a block diagram of the CAT driver shown in FIG. 3.

With reference to FIG. 12, the CAT payment driver 34d can gain read-only access to the master files 58, which are specifically shown as the mortgage file 141, the alter file 142, the escrow file 143, and the miscellaneous file 144. As discussed above, the CAT driver 34*d* needs to access the information in these files in order to provide the customer with a receipt and with updated information on the account but does not perform the actual updating of the master files 58. Rather, the payment driver 34*a* will perform this function of updating the master files 58. The CAT driver 34*d*, however, can both read and write files to the PFM memo post file 68 and can write files to the transaction queue 41.

The monitor 35, in general, evaluates the CICS environment and passes information to the handler 31 through the handler mover control interface file 52. The information passed to the handler 31 relates to the actual completion of existing drivers 34, time delays in driver completion, manual control orders issued to the handler 31, and arrival of additional transactions. The monitor 35 also provides speed control to the PFM system 12 with this speed control being focused on the routers 33 and the drivers 34. This information also has default values which may be transferred from the security file 47 to the handler mover control interface file 52. The monitor 35 further prohibits the handler 31 from exceeding a maximum number of router 31 and driver 34 combinations and thus limits the maximum speed of the PFM system 12. The monitor 35 provides this speed limit by issuing an immediate "STOP" command to the handler 31 if the maximum number of combinations has been exceeded. Advantageously, the monitor 35 continuously evaluates the CICS environment and continuously checks the speed of the PFM system 12, whereby the PFM system 12 can react almost instantaneously to any variances in load to the PFM system 12.

The monitor 35, more specifically, determines a throughput rate of the PFM system 12. This throughput rate can be expressed mathematically as: $(F(Z)/F(X)) \times F(Y)$, where $F(X)$ is the average point-to-point completion rate for the drivers 34, $F(Y)$ is the hours of available processing operation time, and $F(Z)$ is the average number of running drivers 34. As an example, the processing system 12 has been shown to have an average point-to-point completion rate $F(X)$ of 3.5 seconds, has 16 hours of available processing time $F(Y)$, and has an average $F(Z)$ of 40 drivers 34. Consequently, the PFM system 12 has been established to have a throughput rate of $(40/(3.5 \text{ sec})) \times (16 \text{ hours}) = 658K$. Actual throughput data has shown that 85% of overall throughput can be achieved with a true value of about 559K. The overall throughput rate, however, can be reduced by factors such as the available number of running hours $F(Y)$, file placement on DASD which would increase the point-to-point completion rate $F(X)$, and the average number of running drivers 34 $F(Z)$. If service was reduced from 16 hours to 14 hours, the number of concurrent transactions was reduced from 40 to 30, and the completion rates were increased from 3.5 seconds to 7 seconds, the throughput rate would be 216K and the 85% value of this rate would be 183K. Thus, as an extremely low estimate, portfolios of about 900K accounts could be supported by the PFM system 12 assuming that one fifth of the payments all arrive on one day.

The monitor 35 also determines and tracks the consumption rate in million instructions per second (MIP). The payment drivers 34 each has an associated instruction set IS, which is equal to $F(BI)+(0.2 \times F(BI))$, where $F(BI)$ is the base instruction set having approximately 178K, the factor of $(0.2 \times F(BI))$ relates to overhead execution at a level of 20%, and IS specifies the total instruction set. The total instruction set IS for the preferred embodiment is thus 178K+ (0.2*178K), which is 214K. An average completion range or tolerance band is from 3 to 6.3 seconds with a daily average of 4.65 seconds and an available daily processing time of 14 hours. At a maximum speed limit of 30 concurrent transactions with a daily average of 24, an IS per second value, defined by IS/Average Completion Rate, is equal to 214K/ 4.65, or 46K per second. At an average of 24 concurrent drivers 34, the PFM system 12 has a value of 1.1 MIPS.

The throughput rate for the PFM system 12 can be calculated as 24/4.65 or 5.16 transactions per seconds with the 85% value of this rate being 4.39 transactions per second. The rate per hour is thus 15.8K transactions and the rate per a 14 hour day is 221.3K. The 20% overhead includes the execution code for the handler 31, mover 32, and router 33 and the 85% against transaction completion covers CICS overhead plus MVS/ESA overhead. The above calculations are based on a vertical group containing only one transaction. If the transactions are processed as part of a vertical group having more than one transaction, the PFM system 12 can obtain an even greater throughput per transaction.

Figure 13:
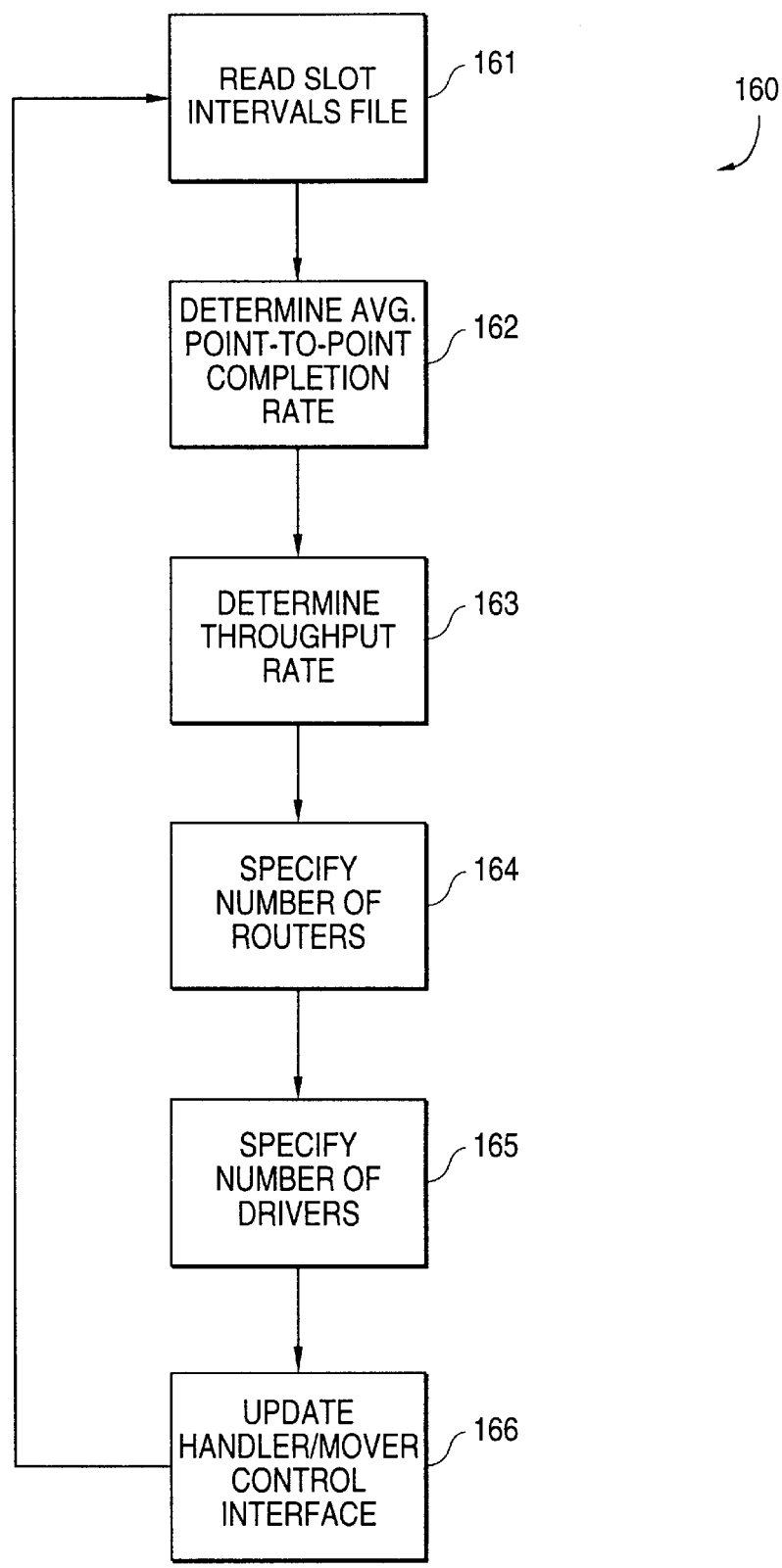
FIG. 13 is a flowchart of operations for the monitor shown in FIG. 3.

A method 160 generally summarizing the operations of the monitor 35 is shown in FIG. 13. At step 161, the monitor 35 reads the data in the slots intervals file 57 relating to the completion times for the drivers 34. From this data, the monitor 35 determines the average point-to-point completion rate at step 162. Based on the point-to-point completion rate and on the data stored in the handler mover control interface file 52, the monitor 35 next specifies the number of permissible routers 33 at step 164 and the number of permissible drivers 34 at step 165. For example, if the point-to-point completion rate is between 1.0 second and 1.6 seconds, the number of drivers 34 is not changed. The number of drivers 34, however, is increased when the point-to-point completion rate is less than 1.0 second and is decreased if the point-to-point completion rate is above 1.6 seconds. The monitor 35 will then perform appropriate updates to the handler mover control interface file 52 at step 166. The monitor 35 adjusts the number of routers 33 and drivers 34 so that the consumption varies according to a step progress curve with a maximum plateau defined by the speed limit of the PFM system 12. After the handler mover control interface file 52 has been updated, the processing returns to step 161 so as to provide a continuous method 160 for monitoring the speed and consumption of the PFM system 12.

By continuously tracking the speed of the PFM system 12, the monitor 35 ensures constant and even resource consumption throughout the CICS processing day without the 'spikes' that usually occur with other conventional processing systems. The monitor 35 self controls the resource consumption, whereby terminal slow-down and response are controlled. The PFM system 12 will consume resources when they are available up to a maximum speed limit with continuous monitoring of demand load by the monitor 35. In this way, the PFM system 12 balances itself with other activity occurring in CICS.

The PFM system 12 has a number of input/output units for permitting manual control of the system 12. These input/ output units are designated as elements 49, 71, and 72. The input/output unit 49 can supply inputs to the calendar record maintenance device 46 which maintains the calendar records stored on the security file 47. The calendar records, as discussed above, are used to determine what days and during what hours the handler 31 and mover 32 are to be active. The calendar records maintenance device 46 maintains the following fields: the date, a reason code which is blank for a work day, W for a weekend, and H for a holiday, handler start and stop times, and mover start and stop times. These fields may be modified through the input/output device 49.

The input/output device 49 is also connected to the transaction handler defaults device 48. The transaction handler defaults device 48 maintains the handler 31, mover 32, and router 33 defaults stored in the handler records on the security file 47. The defaults are loaded to the temporary storage queue in the handler mover control interface file 52 when the handler 31 is started. The following fields may be altered through the input/output device 49: maximum number of routers 33, default number of routers 33, decrement factor in routers 33, increment factor in routers 33, elapsed averages in milliseconds both high and low for the routers 33, bypass transaction codes for the routers 33, start intervals in milliseconds for the mover 32, retry interval in milliseconds for the mover 32, retry count for the mover 32, and maximum records for the mover 32.

The input/output device 49 is further connected to the transaction queue inquiry device 66. The transaction queue inquiry device 66 provides data to the input/output device 49 for displaying the payments appearing on the payment transaction queues 39, 40, and 42 and serving as inputs to the mover 32. Although each queued transaction has the ability to carry other transaction codes, the transaction queue inquiry device 66 preferably only shows key payment information, but could alternatively provide additional information. The data displayed by the input/output device 49 will be dynamic in nature especially if the payment driver 34a or the CAT payment driver 34d are active. In general, the transaction queue inquiry device 66 and input/output device 49 allow users to determine the status of the queues at any specific point in time.

The input/output device 71 provides on-line control of the monitor 35. As discussed above, the monitor 35 monitors and manipulates the operations of the handler 31, mover 32, and routers 33 by altering the contents of the temporary storage queue in the handler mover control interface file 52. The device 71 permits dynamic updates to some of the functions taking affect immediately but remaining in effect only until the handler 31 is deactivated. When the handler 31 is then reactivated, the system defaults stored in the handler record on the security file 47 will take affect.

A group of the updates that may be entered through the device 71 relate to the handler 31, which is associated with a type code "H." These updates include a start update, having an action code "S," used to manually start the handler 31. When requested, the verify file availability device 51 will execute to determine if all files used by the PFM system 12 are active to CICS. The calendar record stored on the security file 47 corresponding to the current date is then accessed to verify that the current day is a work day and the time of day is within the start and stop times stored on this record. If all edits are passed, a CICS START command for the handler 31 is executed through the device 71. Another update is a stop, having an action code "P," which is used to manually stop the handler 31. In order for the stop to be effective, the mover 32 and routers 33 must also be stopped. The mover 32, however, can only be stopped when no transactions are actively being moved while the routers 33 can be stopped at any time. A further update, having an action code "T," is used to dynamically change the start and stop times of the handler 31 overriding the times loaded from the calendar record stored on the security file 47. A slot update, having an action code "N," is used to dynamically change the default and maximum number of slots used to control the routers 33 and overrides the values loaded from the handler default record stored on the security file 47. An inquiry function, having an action code "I" is used to show the status of the handler 31 and a variances function, having an action code "V," dynamically changes the high and low elapsed averages in milliseconds used to control the routers 33 and overrides the values loaded from the handler default record stored on the security file 47.

Another update that may be accomplished through the input/output device has a type code of "Q" and is directed to handler queue requests. An action code of "P" for stop is used to manually delete the temporary storage queue in the handler mover control interface 52 after a malfunction in the PFM system 12. During a malfunction, the handler 31 normally deletes this queue when it is stopped.

Another type code of "M" is used to perform updates related to the mover 32. An action code of "S" is used to manually start the mover 32 instead of waiting for the handler 31 to start it based on normal retry intervals. When requested, a CICS START command for the mover 32 is executed. An action code of "P" for stop is used to manually stop the mover 32. This stop of the mover 32, as stated above, cannot occur until all records for a given batch are processed due to its handling of batch control totals. Thus, if the stop action code is entered, the mover 32 will show a status of "QUIESCING" until the batch is complete, at which time it will stop. An action code for times "T" is used to dynamically change the start and stop times of the mover 32, thereby overriding the values loaded from the calendar record stored on the security file 47. An inquiry update having an action code of "I" is used to show the status of the mover 32.

The router 33 can also be updated through the input/output device 71 with a type code of "R." An action code of "S" is used to manually start the routers 33 instead of waiting for the handler 31 to start them. When requested, the CICS START command for the routers 33 will be executed based on the router control variables found in the temporary storage queue in the handler mover control interface file 52. A stop update, having action code "P," is used to manually stop the routers 33. When requested through the device 71, no additional routers 33 may be started by the handler 31 until after the current routers 33 finish their tasks. An inquiry as to the status of the routers 33 may be made through an action code of "I."

Other updates are included under a type code "F" for file requests and a type code "T" for transaction requests. Under the type code "F," an action code of "I" is used to show the status of the temporary transaction queues 39, 40, and 42 input to the mover 32. Under the type code "T," an action code of is used to dynamically allow transactions to be sent to the routers 33 that were bypassed either dynamically or due to the handler record defaults stored on the security file 47. Also under type code "T," an action code "P" for stop is used to dynamically keep transactions from being sent to the routers 33 in case of a system malfunction.

The input/output device 72 provides a communications interface between a transaction handler message device 54 and the transaction mover queue update device 55. The transaction handler message device 54 displays on the device 72 any errors encountered during processing, such as in the handler 31, mover 32, router 33, or driver 34. Any errors are stored on the router mover error file 53 and displayed starting at the beginning of the file. The errors are reported and deleted from the file during nightly batch processing. The transaction mover queue update device 55 maintains mover queue records stored on the router mover error file 53. As discussed above, the mover queue records are used to determine the order in which temporary queue files will be processed as inputs to the mover 32. The records are also used to keep track of the RBA for the last record processed by the mover 32. Through the transaction mover queue update device 55, records are maintained for the input queue name, priority for a queue, record length, key length, the RBA for the last record information, the program name required for any special processing of the transaction, such as the cash loader 62, and the output queue.

A memo file inquiry device 67 provides displays of any CAT payments that have been posted to the memo post file 68 by the CAT payment driver 34d. Since the master files 58 are read-only in CICS during batch processing, any updates resulting from CAT payments are memo posted by the CAT driver 34d to allow the customer to see the results of their payments immediately. When the handler 31 and subsequently the payment driver 34a are activated, the payments in the memo post file 68 will be permanently posted to the master files 58 and deleted from the memo post file 68. Until the time that the payment driver 34a performs this permanent update, the memo file inquiry device 67 may be used to view any CAT payments that have been made since the last update of the master files 58. The inquiry device 67 will start at the beginning of the file unless an account is entered to start the search at a specific point. A series of four records will exist for each account that was memo posted based on the DLS master file 58 that was updated.

In the preferred embodiment, the handler 31, mover 32, router 33, drivers 34, monitor 35, and various other components of the PFM system 12 comprise on-line CICS programs operated on a mainframe computer. Since the generation of programs for the various elements of the PFM system 12 will be apparent to one of ordinary skill in the art, further details of the programs have been omitted in order to simplify the description of the invention. While the invention is preferably implemented on a single mainframe computer, it should be understood that the invention can be implemented with more than one processor. Other variations to the invention will be apparent to those skilled in the art.

In summary, the PFM system 12 permits the on-line processing of transactions received from various sources, such as lock-box facilities 17, a CAT 13, an enhanced telephone 15, or a personal computer 16. Consequently, delays between depositing payments and the actual posting of the payment to the master files 58 have been significantly reduced. For instance, instead of a delay of twenty four or more hours with a conventional processing system, the processing system 10 according to the invention is easily capable of updating the master files 58 within hours. The monitor 35 in the system 12 provides continuous speed control thereby preventing the PFM system 12 from presenting unacceptable delays to the normal users 18 of the system 12. With the monitor 35, the system 12 is able to sense and react very quickly to any change in environment conditions, such as either an increase or decrease in the demand from the normal on-line users 18. The system 12 also presents a hierarchical treatment of transactions whereby the more urgent transactions are processed before other less urgent transactions.

It should be recognized that the system and method disclosed are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A transaction processing system comprising:
    a central processing facility;
    a receiving facility for receiving payments to individual accounts and for generating batch payment data based on the payments;
    a central processing facility comprising;
        a batch converter for receiving said batch payment data from said receiving facility and for converting said batch payment data into payment transaction data for the individual accounts;
        a transaction handler;
        a transaction mover that transfers transaction data from temporary storage queue files to a transaction queue;
        a plurality of payment drivers;
        a plurality of transaction routers that determine to which drivers to assign the transaction data;
        said payment drivers receiving said transaction data and updating a set of account master data files to reflect said payments; and
        a transaction monitor for tracking a time of completion for each payment driver and for writing said permissible number of drivers to a temporary storage queue;
        wherein said transaction monitor further determines the maximum number of said routers and said drivers based on said completion times, thereby providing variable processing speed control to the system;
        wherein said handler determines when transaction data is available for processing and assigns transaction data to said routers; and
        wherein said transaction handler reads said temporary storage queue and limits the number of routers which are active based on said permissible number of drivers specified in said temporary storage queue.

2. The processing system as set forth in claim 1, wherein said receiving facility comprises a lock-box facility and said receiving means comprises scanning equipment for capturing said transaction data from payment coupons and checks.

3. The processing system as set forth in claim 1, wherein said receiving facility comprises a home services delivery system and said receiving means obtains said transaction data from an enhanced telephone.

4. The processing system as set forth in claim 1, wherein said receiving facility comprises a home services delivery system and said receiving means obtains said transaction data from a personal computer.

5. The processing system as set forth in claim 1, wherein said receiving facility comprises an automated teller machine and said receiving means obtains said transaction data from customer inputs to the automated teller machine.

6. The processing system as set forth in claim 1, wherein said batch converter stores said payment transaction data on a temporary storage queue.

7. The processing system as set forth in claim 1, wherein said transaction handler transfers said transaction data from said transaction queue to an available router.

8. The processing system as set forth in claim 1, wherein said routers store completion times for their respective drivers in a slots intervals file and said monitor receives said completion times from said slots intervals file and determines an average completion time for all of said drivers.

9. The processing system as set forth in claim 1, wherein said handler activates said mover at regular intervals of time.

10. The processing system as set forth in claim 1, wherein said monitor determines said permissible number of drivers at regular intervals of time.

11. The processing system as set forth in claim 10, wherein said regular intervals of time comprises every 20 milliseconds.

12. The processing system as set forth in claim 10, wherein said monitor prevents the number of permissible drivers from exceeding a maximum number of drivers.

13. The processing system as set forth in claim 1, wherein said routers assign transaction data representing a plurality of payments to each payment driver.

14. The processing system as set forth in claim 1, wherein said handler classifies said payment transaction data into a plurality of priority groups, said handler transferring said transaction data to routers in the priority groups in order of priority beginning with a highest priority group so that said drivers update said master files based on said transactions in said highest priority group before transactions in any other priority group.

15. The processing system as set forth in claim 1, wherein said central processing facility further comprises means for providing access to said master files for at least one account service provider while at least one of said drivers is active.

16. A method for processing transactions comprising:
receiving payments and generating batch payment data at a receiving facility;
transferring said batch payment data to a central facility and converting said batch payment data to transaction data;
moving said transaction data from temporary storage queue files to a temporary queue;
determining to which individual payment drivers to assign said transaction data on said temporary queue;
assigning said transaction data to transaction routers;
updating individual account information in said master files with said payment drivers based on payments reflected in said payment transaction data;
monitoring a completion time for each payment driver; providing variable processing speed control to the system by controlling the number of drivers and routers which are permitted to be active based on the completion times for the payment drivers; and
determining when said transaction data is available for processing.

17. The method as set forth in claim 16, further including a step of providing access to said master files to service providers for the individual accounts.

18. The method as set forth in claim 16, further including a step of classifying said transaction data into priority groups and performing said updating step in order of priority beginning with a group of transaction data in a highest priority.

19. The method as set forth in claim 16, wherein said step of receiving comprises the step of receiving payments from an automated teller machine.

20. The method as set forth in claim 16, wherein said step of receiving comprises the step of receiving payments from a lock-box facility.

21. The method as set forth in claim 16, wherein said step of receiving comprises the step of receiving payments from an enhanced telephone.

22. The method as set forth in claim 16, wherein said step of receiving comprises the step of receiving payments from a personal computer.

23. The method as set forth in claim 16, wherein said step of monitoring comprises a step of determining an average completion time for said drivers.

24. The method as set forth in claim 16, wherein said step of monitoring is repeated at regular intervals so that a speed of processing said payments is continuously monitored.

25. The processing system as set forth in claim 1 wherein said speed control minimizes the consumption of system resources due to the processing of said payment transaction data relative to other on-line processes thereby permitting simultaneous payment processing and on-line account services processing.

26. The method as set forth in claim 16 further wherein the consumption of system resources due to the processing of said payment transaction data relative to other on-line processes is minimized.

27. The method as set forth in claim 16 further wherein payment processing and on-line account services processing occur simultaneously.

28. The processing system as set forth in claim 1 wherein said payments comprise financing payments.

29. The processing system as set forth in claim 28 wherein said financing payments comprise mortgage payments.

30. The processing system as set forth in claim 28 wherein said financing payments comprise automobile and mobile home payments.

31. The processing system as set forth in claim 28 wherein said financing payments comprise student loan payments.

32. The method as set forth in claim 16 wherein said payments comprise financing payments.

33. The method as set forth in claim 32 wherein said financing payments comprise mortgage payments.

34. The method as set forth in claim 32 wherein said financing payments comprise automobile and mobile home payments.

35. The method as set forth in claim 32 wherein said financing payments comprise student loan payments.

* * * * *